(12) United States Patent
Foster

(10) Patent No.: US 9,743,803 B2
(45) Date of Patent: Aug. 29, 2017

(54) MIXING BOTTLE CAPABLE OF DISASSEMBLY

(71) Applicant: REPLENISH BOTTLING, INC., Los Angeles, CA (US)

(72) Inventor: Jason E. Foster, Los Angeles, CA (US)

(73) Assignee: REPLENISH BOTTLING, LLC, Los Angeles, CA (US)

( * ) Notice: Subject to any disclaimer, the term of this patent is extended or adjusted under 35 U.S.C. 154(b) by 0 days.

(21) Appl. No.: 14/736,697

(22) Filed: Jun. 11, 2015

(65) Prior Publication Data

US 2015/0360814 A1    Dec. 17, 2015

Related U.S. Application Data

(60) Provisional application No. 62/011,522, filed on Jun. 12, 2014.

(51) Int. Cl.
*B65D 81/32* (2006.01)
*A47J 31/40* (2006.01)

(52) U.S. Cl.
CPC ........... *A47J 31/40* (2013.01); *B65D 81/3211* (2013.01)

(58) Field of Classification Search
CPC ......... A47J 31/40; B65D 23/04; B65D 25/08; B65D 81/3205; B65D 81/3211; B67B 7/00
USPC ............... 206/219, 221, 222; 215/6, DIG. 8; 222/83, 83.5, 106, 133, 134, 157, 158, 222/180, 184, 207, 209
See application file for complete search history.

(56) References Cited

U.S. PATENT DOCUMENTS

| | | | | |
|---|---|---|---|---|
| 4,823,946 A * | 4/1989 | Stoeffler | ............ | B65D 81/3211 206/221 |
| 5,277,303 A * | 1/1994 | Goyet | ................ | B65D 81/3211 206/219 |
| 5,647,481 A * | 7/1997 | Hundertmark | ..... | B65D 81/3211 206/219 |
| 5,908,107 A * | 6/1999 | Baudin | ............... | B65D 81/3211 206/221 |
| D415,959 S * | 11/1999 | Antoine | ......................... | D9/724 |
| 6,244,433 B1 * | 6/2001 | Vieu | ................... | B65D 81/3211 206/221 |
| 6,247,586 B1 * | 6/2001 | Herzog | ............... | B65D 81/3211 206/221 |
| 6,321,908 B1 * | 11/2001 | Lorscheidt | ......... | B65D 81/3211 206/221 |
| 6,450,368 B1 * | 9/2002 | De LaForcade | ......... | B65D 1/04 206/221 |
| 7,066,323 B1 * | 6/2006 | Reisman | ............. | B01F 15/0205 206/222 |
| 7,565,988 B2 * | 7/2009 | Foster | ................. | B05B 11/0056 222/129 |
| 7,850,043 B2 * | 12/2010 | Foster | ................. | B05B 11/0056 206/219 |

(Continued)

*Primary Examiner* — Bryon Gehman
(74) *Attorney, Agent, or Firm* — Kleinberg & Lerner, LLP; Marvin H. Kleinberg; Marshall A. Lerner

(57) ABSTRACT

A mixing container is designed to be disassemblable so that its component parts can be thoroughly cleaned. The container has a removable base which includes a valve assembly through which fluid concentrates can be added from a replaceable pod, In some embodiments, a measuring cup is a part of the removable base. In other embodiments, a measuring receptacle is integrated with the container.

6 Claims, 5 Drawing Sheets

(56) References Cited

U.S. PATENT DOCUMENTS

| 8,152,025 B2* | 4/2012 | Foster | B05B 11/0056 |
| | | | 206/219 |
| 2006/0113201 A1* | 6/2006 | Micic | B65D 81/3211 |
| | | | 206/221 |

* cited by examiner

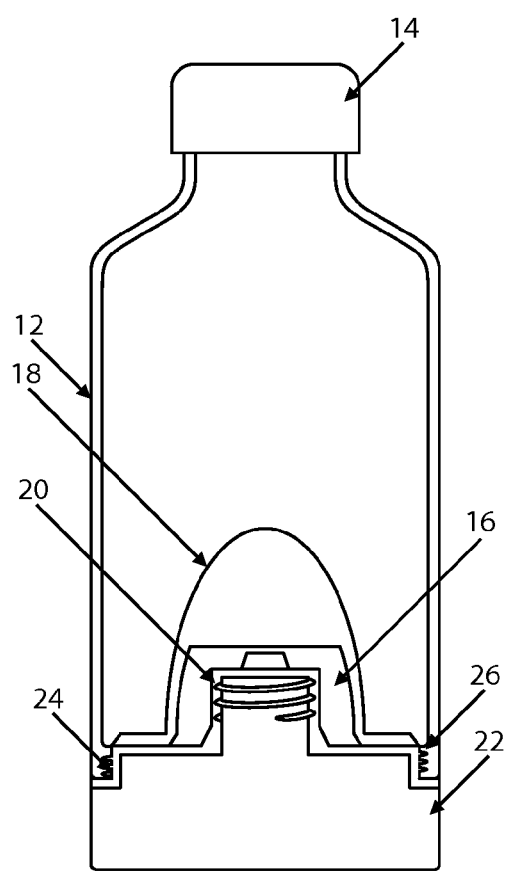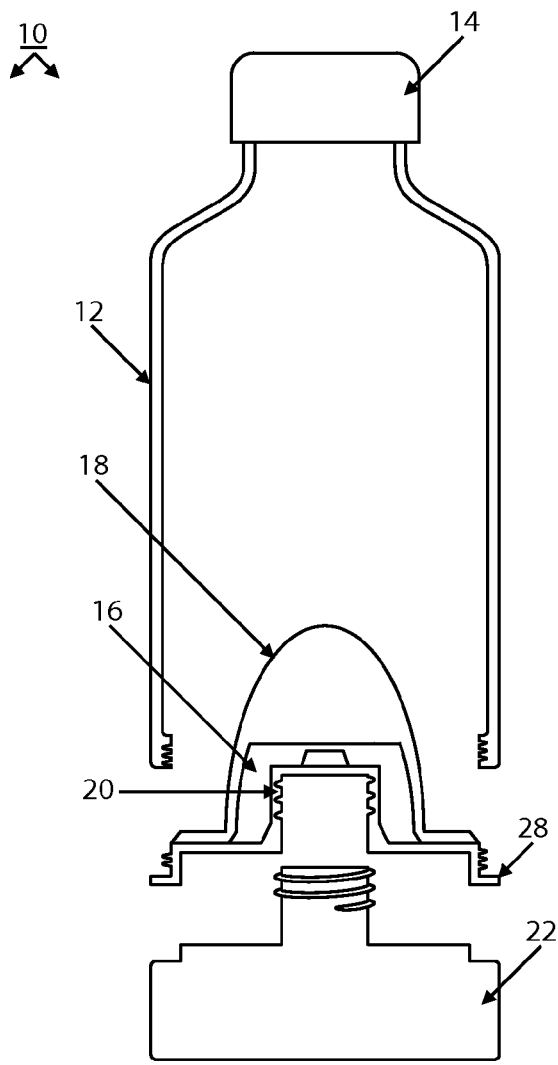
*FIG. 1A*          *FIG. 1B*

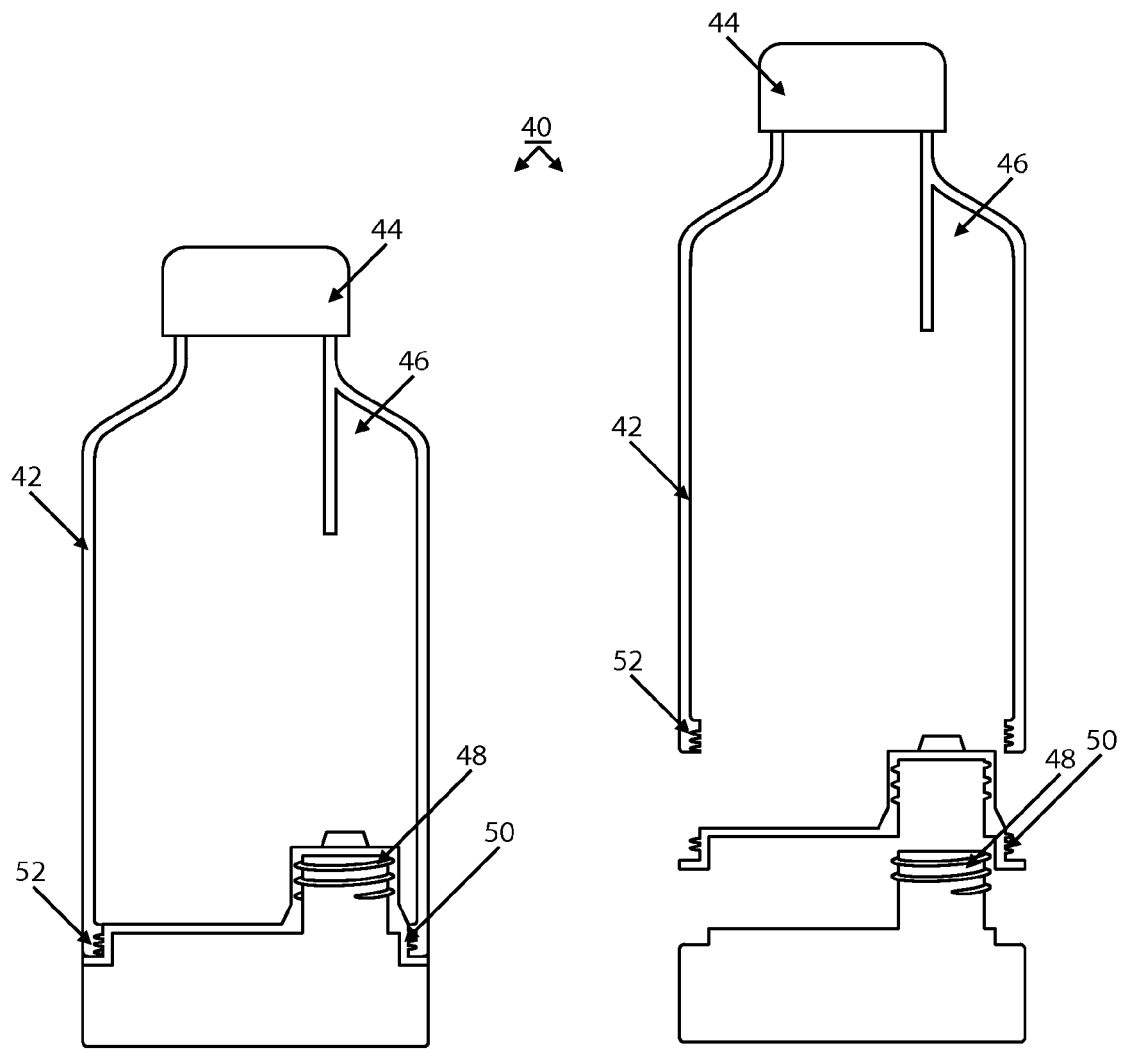
*FIG. 2A*  *FIG. 2B*

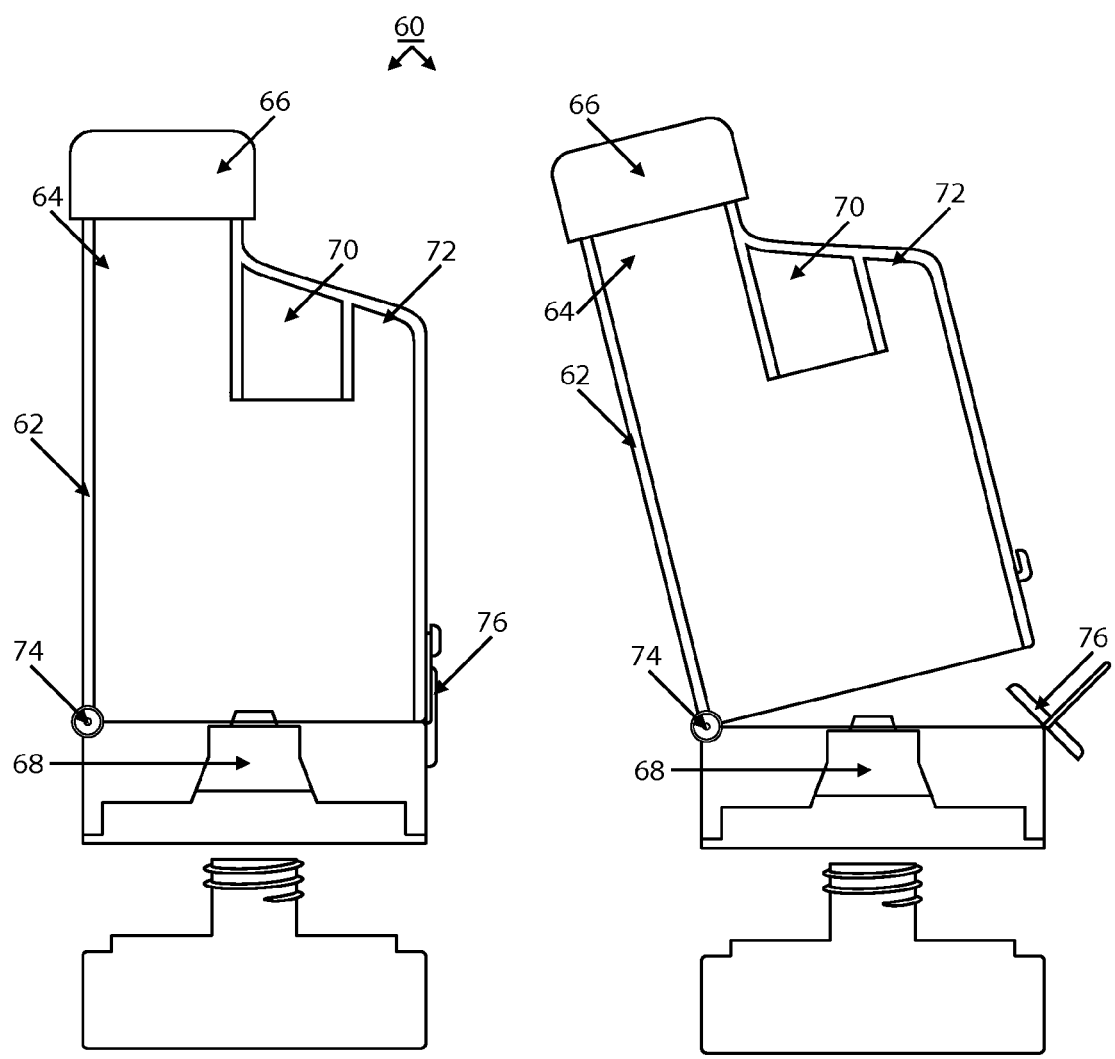
*FIG. 3A*                    *FIG. 3B*

MIXING BOTTLE CAPABLE OF DISASSEMBLY

FIELD OF THE INVENTION

The present invention consists of a self-contained mixing and dispensing container having multiple attachment options for sealing and closing that can be disassembled for cleaning. The attachment options can be, but are not limited to, threads, snap fits, or clasps.

DESCRIPTION OF THE RELATED ART

Currently, refillable/reusable mixer bottles are comprised of two or more chambers, a mechanism by which fluid may be transferred from one chamber to the other, and a mechanism by which to dispense or deliver the mixture. Openings in each of the chambers allow for refilling the chambers with an appropriate fluid.

The problem with existing mixer bottles is that the mixing chamber cannot be disassembled and reassembled for cleaning and other desired or necessary tasks. Without disassembly, the user is unable to thoroughly wash the chambers, especially if they have been used with concentrated beverages, liquid nutrition or other solutions that would require thorough rinsing and cleaning before reuse with other fluids.

BRIEF DESCRIPTION OF INVENTION

The present invention provides a reusable mixing bottle or container that can be disassembled for cleaning. A base element of the bottle is removable from the bottle, which becomes substantially bottomless to facilitate cleaning. For those models with an interior measuring cup adjacent the base, that element is also removable. Alternatively, there may be a pivot around which the base can rotate so that it is not completely separated from the bottle. While in the preferred embodiments, the mixing bottle and its components may be made of plastics, for some uses it may be preferable to fabricate the bottle or its component parts of a metal such as aluminum or stainless steel, or glass, depending upon the intended use. The use of a metal or glass can result in a longer lasting bottle and reduce the use of plastics.

The base can be coupled to the bottle with a friction or other fit to hold the base in place. The base may also have a depending shroud which can serve as a stand for the bottle. The shroud portion is circumferential so that a pod can be coupled to the base. In some embodiments, the base and bottle can be provided with threads with a gasket in the base so that the base can be coupled to the bottle in a leakproof relationship. Alternatively, a latch may be provided to hold the base in place. Releasing the latch permits the base to swivel about the pivot.

Accordingly, it is an object of the invention to provide multiple ways to take apart and reassemble the mixing chamber of a reusable dispenser. In doing so, the user has the option to wash the component elements in the dishwasher or by hand.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 1 including FIGS. 1a and 1b shows, respectively, the fully assembled and disassembled refillable/reusable mixing and dispensing container which utilizes a press fit closure;

FIG. 2. including FIGS. 2a and 2b shows an alternative embodiment of the fully assembled and disassembled container;

FIG. 3, including FIGS. 3a and 3b shows yet an another alternative embodiment of an assembled and disassembled container utilizing a latch closure and;

DETAILED DESCRIPTION OF DRAWINGS

Figure 4:
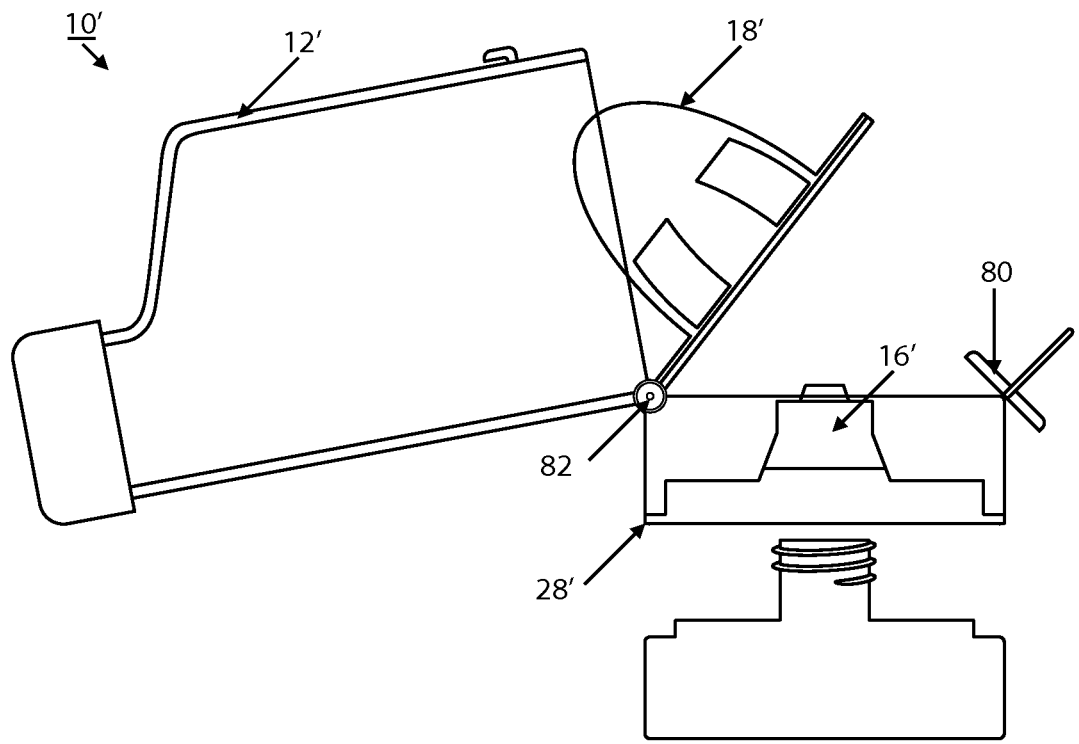
FIG. 4. shows another alternative embodiment of the container utilizing a latch closure.

Turning first to FIG. 1 which includes FIGS. 1a and 1b, there is shown an assemblable and disassemblable container 10 according to the present invention. The container 10 includes a first mixing chamber 12 of bottomless construction with a removable cap 14. At the base of the chamber 12, is a valve assembly 16 with an integral mixing cup 18 and which provides a bottom. In this embodiment, the valve assembly 16 includes a threaded portion 20 to which a removable pod 22 can be attached. The pod 22 contains a liquid concentrate which when properly diluted becomes the contents of the mixing chamber 12. When ready for use, the cap 14 is removed and replaced with an appropriate dispensing mechanism (not shown) which may be a spray nozzle. Alternatively, if the diluted contents are a beverage, then the cap 14 is removed to gain access to the beverage.

In this embodiment, the valve assembly 18 has a peripheral gasket 24 which can sealingly engage the base 26 of the mixing chamber 12 with a secure liquid-tight press fit to provide a bottom for the mixing chamber 12. A tab 28 adjacent the gasket 24 assists in the removal of the valve assembly 18 from the base 26 of the mixing chamber 12.

When it is desired to disassemble the container 10, the tab 28 can be used to separate the valve assembly 18 and its gasket 24 from the base 26 of the mixing chamber 12. Both the valve assembly 18 and the mixing chamber 12 can now be separately cleaned of the previous contents and prepared for reuse.

Turning next to FIG. 2 which includes FIGS. 2a and 2b, there is shown assembled and disassembled, an alternative embodiment of a mixing container 40 according to the present invention. As with the embodiment of FIG. 1, the container 40 includes a mixing chamber 42 of bottomless construction for ease in cleaning with a removable cap 44.

In lieu of a mixing cup, the mixing chamber 42 is fitted with a mixing reservoir 46 into which a concentrated liquid is dispensed. To accomplish this, a valve assembly 48 is eccentrically fitted to the base 50 of the mixing chamber 42. The valve assembly 48 is fitted with a peripheral gasket 52 that enables the valve assembly 48 to sealingly engage the base 50 of the mixing chamber 42.

A peripheral flange (not shown) may be provided to the valve assembly 48 to help in the assembly and disassembly process. As shown, the eccentric placement of the valve assembly 48 allows the use of the reservoir 46 in place of a centrally located measuring cup as in the embodiment of FIG. 1.

Turning next to FIG. 3, including FIGS. 3a and 3b, there is shown yet another alternative embodiment of a mixing bottle 60 according to the present invention. In this embodiment, the mixing bottle includes an upper mixing chamber 62 with an eccentrically placed spout 64 having a removable cap 66. In this embodiment, a valve assembly 68 is centrally located and a reservoir 70 is also centrally located on the upper inner surface 72 of the mixing chamber 62.

The valve assembly 68 is coupled to the mixing chamber 62 by a hinge 74 and is secured to the mixing chamber 62 by a latch assembly 76. In this embodiment, releasing the latch assembly 76, enables the valve assembly 68 to rotate out of engagement with the mixing chamber 62, making the interior of the mixing chamber accessible for washing or otherwise cleaning.

Turning to FIG. 4, there is shown an alternative embodiment to the embodiment of FIG. 1 in which a latch closure 80 in combination with a hinge assembly 82 results in a modified container 10'. All other elements of container 10 of FIG. 1 are present except for the sealing gasket 28. A tab 28' can facilitate the disengagement of the valve assembly 16' from the upper mixing chamber 12'.

Figure 5:
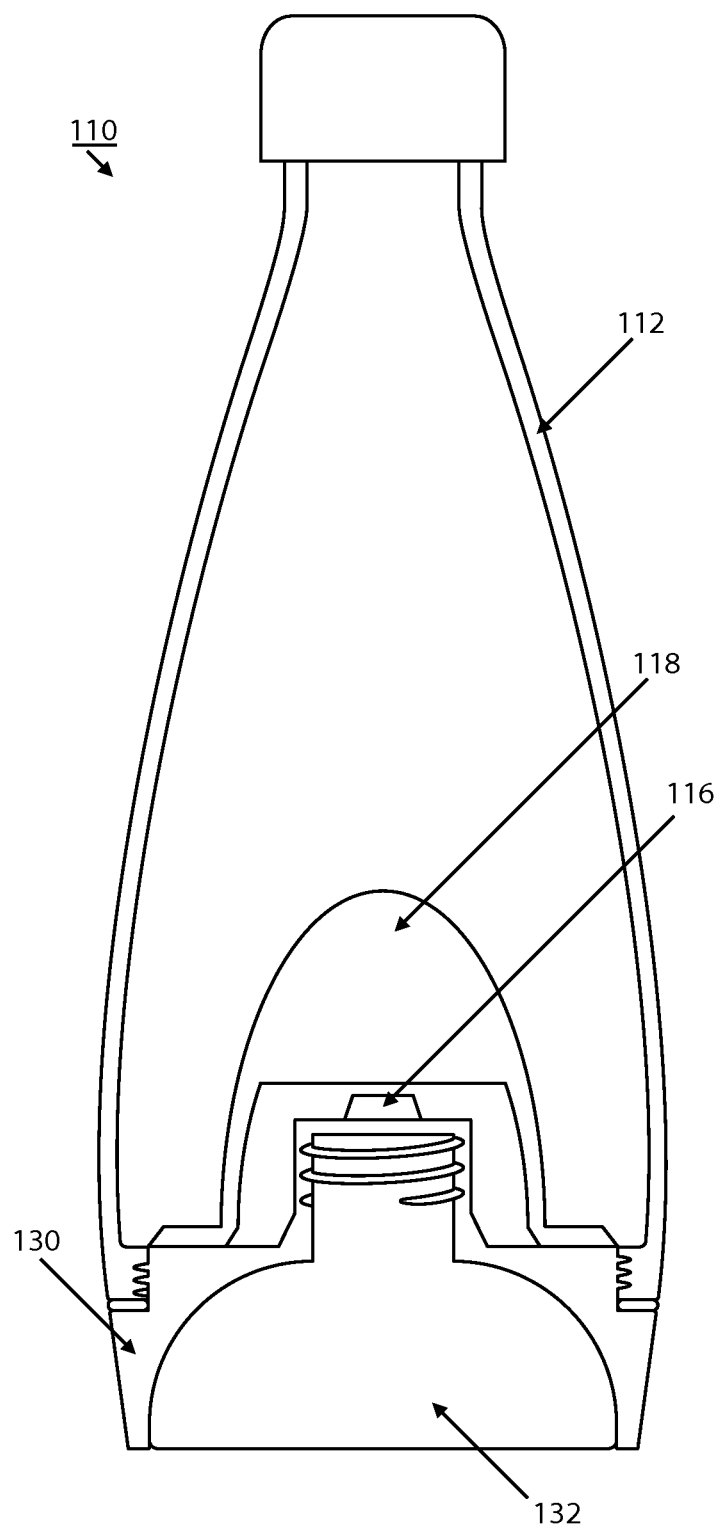
FIG. 5 is an idealized side sectional view of yet another alternative embodiment of a separable mixing container.

FIG. 5 shows another alternative embodiment of the present invention in side section. Here, a container 110 includes a mixing chamber 112 that is of bottomless construction. A valve assembly 116 and measuring cup 118 are part of a base element 126 and serves as a bottom for the mixing chamber 12. The container 110 has peripheral threads 120 that can be engaged by a base element 126 which has a peripheral shroud 130 which can serve as a support stand for the container 110. To assure a fluid tight seal, an internal gasket (not shown) can be provided between the base element 126 and the mixing chamber 112. A pod, 120, filled with liquid concentrate can be coupled to the valve assembly 116 for charging the cup 118 when necessary to refill the container 110.

Other embodiments and variations on the embodiments will occur to those skilled in the art within the scope of the present invention. Accordingly, the invention should be limited only by the scope of the claims appended below.

What is claimed as new is:

1. Apparatus for dispensing liquids comprising the following separable elements:
  a. a first container of bottomless construction for storing liquids to be dispensed;
  b. a measuring cup including means for placing said cup in said first container positioned to receive a liquid;
  c. a valve assembly including means for connecting said valve means to said first container to function as a container bottom and aligned with said measuring cup so that liquids passing through said valve assembly are directed to said measuring cup.

2. The apparatus of claim 1, further comprising:
  a source of liquid including means for connecting said source to said valve assembly for supplying liquid to said measuring cup.

3. Apparatus for dispensing liquids comprising the following separable elements:
  a. a first container of bottomless construction for storing liquids to be dispensed;
  b. a measuring cup including means for placing said cup within said first container positioned to receive a liquid;
  c. a base assembly including means for coupling said assembly to said first container in a fluid tight relationship as a container bottom;
  d. a valve assembly in said base assembly aligned with said measuring cup so that liquids passing through said valve assembly are directed to said measuring cup; and
  e. a shroud extending downward from said base assembly to form a support structure for said first container when it is combined with said base assembly.

4. Apparatus as in claim 3 wherein said means for coupling include complementary screw threads on said base assembly and said first container.

5. Apparatus as in claim 3 wherein said means for coupling include a gasket to provide a fluid tight seal when said base assembly and said first container are coupled together with a friction fit.

6. Apparatus for dispensing liquids comprising the following separable components:
  a. a first container of bottomless construction for storing liquids to be dispensed;
  b. a measuring cup fitted to a side wall of said first container to receive a liquid and;
  c. a valve assembly including means for connecting said valve assembly to said first container as a bottom forming a liquid tight seal therewith and adjacent said side wall in alignment with said measuring receptacle.

* * * * *